United States Patent
Hammer et al.

(10) Patent No.: US 9,496,098 B1
(45) Date of Patent: Nov. 15, 2016

(54) CONTROL SYSTEM

(71) Applicants: Daniel Ray Hammer, Atlanta, GA (US); Kevin Odith Porter, Peachtree City, GA (US)

(72) Inventors: Daniel Ray Hammer, Atlanta, GA (US); Kevin Odith Porter, Peachtree City, GA (US)

(73) Assignee: Cooper Technologies Company, Houston, TX (US)

( * ) Notice: Subject to any disclaimer, the term of this patent is extended or adjusted under 35 U.S.C. 154(b) by 9 days.

(21) Appl. No.: 14/610,494

(22) Filed: Jan. 30, 2015

Related U.S. Application Data (60) Provisional application No. 61/934,224, filed on Jan. 31, 2014.

(51) Int. Cl.
*H01H 9/00* (2006.01)
*H01H 3/12* (2006.01)
*H01H 13/02* (2006.01)

(52) U.S. Cl.
CPC .......... *H01H 3/12* (2013.01); *H01H 13/023* (2013.01); *H01H 2219/036* (2013.01)

(58) Field of Classification Search
CPC . H01H 3/12; H01H 13/023; H01H 2219/036
USPC ............... 200/314, 341, 43.12, 43.13, 43.19, 200/61.02
See application file for complete search history.

(56) References Cited

U.S. PATENT DOCUMENTS

| | | | | |
|---|---|---|---|---|
| 6,504,119 B1 * | 1/2003 | Ribeiro | ........... | H01H 13/14 200/314 |
| 7,361,853 B2 * | 4/2008 | Clegg | ........... | H01H 13/70 200/5 A |
| 7,834,280 B2 * | 11/2010 | Poyner | ........... | H01H 27/002 200/19.06 |
| 8,388,170 B2 | 3/2013 | Hetrick et al. | | |
| 2005/0115816 A1 * | 6/2005 | Gelfond | ........... | G06F 3/0362 200/339 |
| 2008/0135388 A1 * | 6/2008 | Hoehne | ........... | H01H 23/025 200/312 |
| 2008/0169176 A1 * | 7/2008 | Yang | ........... | H01H 9/182 200/310 |
| 2013/0026340 A1 * | 1/2013 | Kanamori | ........... | H01H 13/06 250/200 |
| 2013/0233683 A1 * | 9/2013 | Matsumoto | ........... | H03K 17/968 200/43.11 |
| 2014/0216903 A1 * | 8/2014 | Malek | ........... | H01H 15/24 200/294 |

* cited by examiner

*Primary Examiner* — Edwin A. Leon
(74) *Attorney, Agent, or Firm* — King & Spalding LLP (57) ABSTRACT

A pushbutton and an electrical switch can be linked to one another so that movement of the pushbutton, for example by a user depressing the pushbutton, can control the switch. The switch can be in a closed position prior to being depressed and in an open position afterwards, or vice versa. A photodetector can be located on the switch side of the pushbutton. The pushbutton can be formed of a material that transmits light so that light can pass through the pushbutton for receipt by the photodetector. The pushbutton can additionally or alternatively be formed with an opening that is sized to receive an object inserted by a user. Insertion of the object can manipulate a second electrical switch, which may control flow of electricity from a battery, for example.

20 Claims, 10 Drawing Sheets

CONTROL SYSTEM

CROSS REFERENCE TO RELATED APPLICATIONS

The present application claims priority to U.S. Provisional Patent Application No. 61/934,224 filed Jan. 31, 2014 in the name of Daniel Ray Hammer and Kevin Odith Porter and entitled "Control System for Emergency Lighting System," the entire contents of which are hereby incorporated herein by reference.

TECHNICAL FIELD

Embodiments of the technology relate generally to control systems for emergency lighting, and more particularly to a pushbutton-controlled switch in which the pushbutton transmits light to a photodetector or has an opening for a user to insert an object that controls electrical flow.

BACKGROUND

Electrical systems, such as emergency lighting systems, often incorporate controls through which service personnel or other users can commission, service, inspect, or otherwise interface with the systems. Typical conventional controls are relatively large or dispersed and thus limit the extent to which an emergency lighting system (or other lighting or electrical system) can be miniaturized.

Improved controls and user interfaces for emergency lighting systems and other lighting and electrical systems are needed. Need exists for compact controls. Need exits for integrated controls. Further need exists for a module that can provide useful controls and user interfaces. A capability addressing one or more such needs, or some other related deficiency in the art, would support improved lighting, improved utilization of space, and/or better economics.

SUMMARY

A control system can comprise a pushbutton and an associated electrical switch. The control system may be utilized in a lighting system, such as in an emergency lighting system, or in some other system that utilizes electricity, for example. The pushbutton can have a user side and a switch side. Movement of the pushbutton initiated from the user side can control the electrical switch. For example, a user can open or close the electrical switch (respectively to prevent or allow electrical flow) by depressing the pushbutton. A photodetector can be located on the switch side of the pushbutton. The pushbutton can be formed of a material that transmits light from the user side to the switch side so that light can pass through the pushbutton for receipt by the photodetector. The pushbutton can additionally or alternatively be formed with an opening that is sized to receive an object inserted from the user side. Insertion of the object, for example by a person servicing or commissioning the emergency lighting system, can manipulate a second electrical switch.

The foregoing discussion of controls is for illustrative purposes only. Various aspects of the present technology may be more clearly understood and appreciated from a review of the following text and by reference to the associated drawings and the claims that follow. Other aspects, systems, methods, features, advantages, and objects of the present technology will become apparent to one with skill in the art upon examination of the following drawings and text.

It is intended that all such aspects, systems, methods, features, advantages, and objects are to be included within this description and covered by this application and by the appended claims of the application.

Many aspects of the technology can be better understood with reference to the above drawings. The elements and features shown in the drawings are not necessarily to scale, emphasis being placed upon clearly illustrating the principles of example embodiments of the present technology. Moreover, certain dimensions may be exaggerated to help visually convey such principles.

DESCRIPTION OF EXAMPLE EMBODIMENTS

A module can provide control functions for an electrical system, such as for an emergency lighting system. The control functions can support system testing, user interface, and or other functionality, for example. In some example embodiments, the module can comprise a battery pack test switch.

The present technology can be embodied in many different forms and should not be construed as limited to the embodiments set forth herein; rather, these embodiments are provided so that this disclosure will be thorough and complete, and will fully convey the scope of the technology to those having ordinary skill in the art. Furthermore, all "examples," "embodiments," "example embodiments," or "exemplary embodiments" given herein are intended to be non-limiting and among others supported by representations of the present technology.

Control modules for emergency lighting systems will now be described more fully with reference to FIGS. 1-6, which describe representative embodiments of the present technology and illustrate various elements and views of representative control modules.

Figure 1:
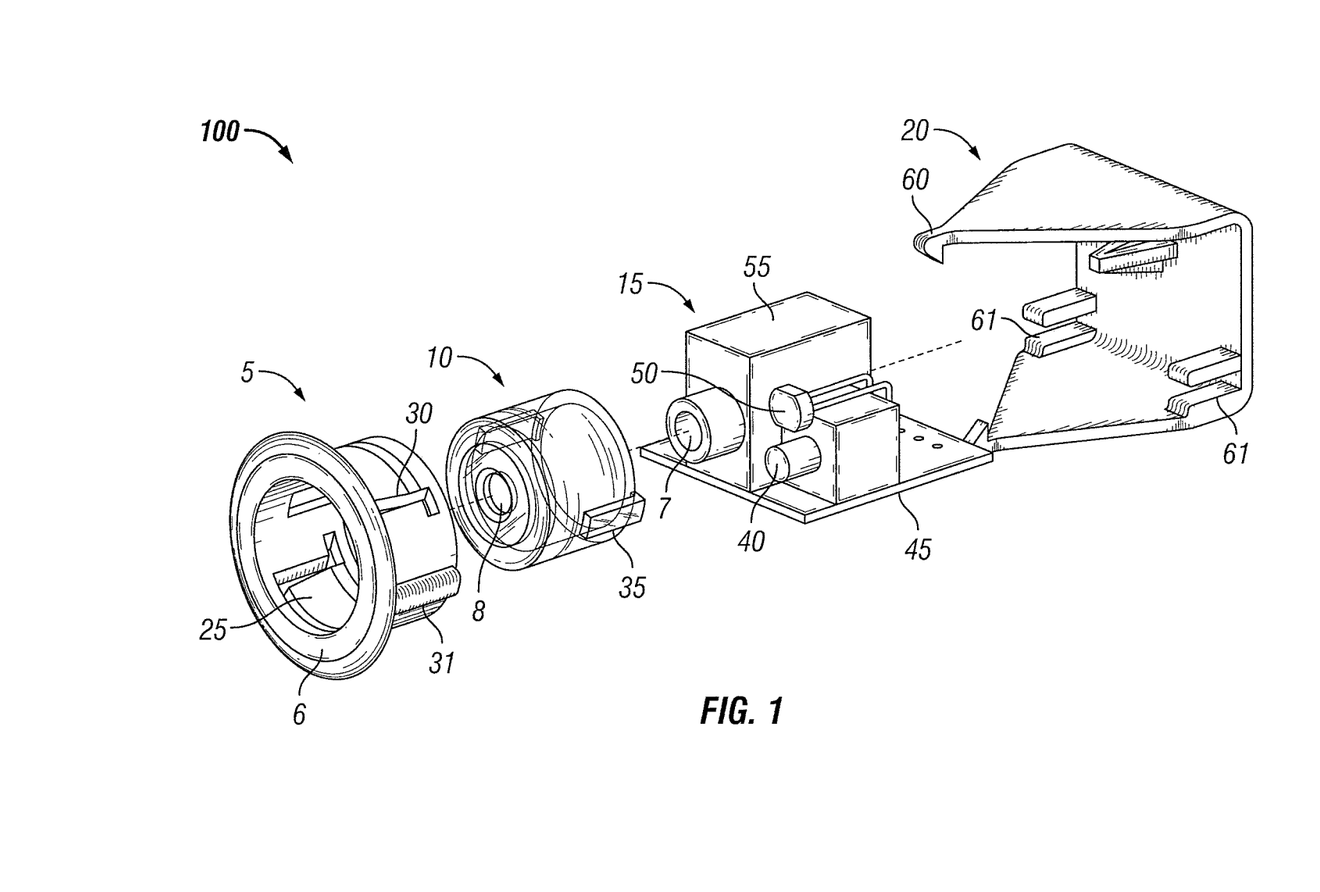
FIG. 1 illustrates, in exploded form, a representative control module that is configured for mounting at a knockout hole of an emergency lighting system according to some example embodiments of the present technology.

Turning now to FIG. 1, this figure is an illustration of a first example of a control module 100 configured for insertion in an aperture in a sheet of material. In some embodiments, the aperture can comprise a knockout hole in an enclosure or housing of an emergency lighting system. In various embodiments, the aperture can comprise a hole in a fixture, structure, plate, sheet, or other member of an emergency lighting system or other electrically powered system, for example. When mounted, the control module 100 is inserted into the aperture and retained.

The illustrated control module 100 comprises an insert in the example form of a retainer element 5, a pushbutton 10, an electronics system 15, and a bracket 20.

The retainer element 5 is sized for insertion in the aperture and comprises retention protrusions 25 splaying slightly outward from the periphery of the retainer element 5. When the retainer element 5 is inserted in an aperture in a sheet of metal (or other appropriate material), the area of the sheet that circumscribes the hole is captured on one side by a flange 6 of the retainer element 5 and on the opposite side by the retention protrusions 25. When the retainer element 5 is pressed into the aperture, the retention protrusions 25 deflect or otherwise deform sufficiently to facilitate insertion, but spring back for capture upon full insertion. Accordingly, the illustrated retention protrusions 25 can be characterized as retention springs.

The pushbutton 10 nests into the retainer element 5 and comprises a ridge or protrusion 35 that fits into a corresponding groove 31 in the retainer element 5. The pushbutton 10 can thus slide along the groove 31. The pushbutton 10 can be formed of clear or translucent plastic to facilitate light transmission as discussed below.

The bracket 20 comprises a pair of prongs 60 that latch to the retainer element 5. More particularly, the prongs 60 engage with slots 30 in the retainer element 5 and are captured. In other words, the prongs 60 snap into the slots 30 for capture.

The bracket 20 further provides a facility in which the electronics system 15 is mounted. The bracket 20 comprises slots 61 that provide a receptacle for a circuit board 45 of the electronics system 15. When the control module 100 is fully assembled, the electronics system 15 is sandwiched on one side by the bracket 20 and on the other side by the retainer element 5 and the nested pushbutton 10, thereby forming a compact unit.

The rear of the circuit board 45 comprises an electrical connection that mates with a wiring harness (not illustrated). The wiring harness links the control module 100 to electrical systems of an emergency lighting system (not illustrated) or of another appropriate system. The connection can include a pin header that receives a ribbon-style array of electrical lines, for example.

The electronics system 15 comprises a photodetector 50 for detecting laser light when a user points a laser at the control module 100. Accordingly, when the emergency lighting system is installed in a location where a technician would ordinarily need a ladder for physical interface, the technician can use a handheld laser to interface remotely with the control module 100 and thus with the emergency lighting system. As discussed above, the pushbutton 10 can be composed of a material that transmits the incoming laser light to facilitate reception by the photodetector 50. Photodetector circuitry can respond when intensity of the received laser light exceeds a predetermined threshold, which would typically be above ambient light level. Thus, the photodetector 50 can ignore background light and respond selectively a user's laser pointer or other handheld light source of appropriate intensity. In some embodiments, as further discussed below, the photodetector 50 can comprise an ambient light detector or an occupancy detector.

The electronics system 15 further comprises a pushbutton switch 40 that is activated when the user (for example a technician or service personnel) depresses the pushbutton 10. In a representative embodiment, linear movement of the pushbutton 10 is picked up and registered by the pushbutton switch 40, resulting in making or breaking an electrical contact, for example. The pushbutton switch 40 may be spring loaded, for example. In one example embodiment, the pushbutton switch 40 responds to approximately 0.020 inches of linear movement. However, other embodiments may respond to less or more movement.

The electronics system 15 may further comprise a light emitting diode (LED) that indicates state of a battery of the emergency lighting system. In some example embodiments, the indicator light emitting diode may emit one color of light if the battery is fully charged and another color if the battery charge is partially or fully depleted (and thus needs a recharge or other service). In some embodiments, the indicator light emitting diode signals that the battery is being charged. For example, the indicator light emitting diode may emit one color of light during charging of the battery and another color during battery discharging. As discussed above, the pushbutton 10 may be composed of material that can transmit light. Accordingly, the pushbutton 10 can transmit outgoing light as an indicator or status signal for user observation. The electronic component 50, which is characterized as a photodetector, may be the indicator light emitting diode to emit rather than receive light, for example.

In some embodiments, the control module 100 comprises an occupancy detector. The occupancy detector may comprise a photodetector that responds to infrared light to determine whether one or more people are in the area based on received body heat, for example. The infrared light emanating from a person can pass through the pushbutton 10 for reception by the photodetector, for example. In some embodiments, the control module 100 may incorporate passive infrared (PIR) motion detection, a Doppler motion detector, an ambient light detector, or any combination thereof.

The illustrated electronics system 15 further comprises a battery connect/disconnect unit 55 that contains an electrical switch and an aperture 7. The electrical switch can place a battery of the emergency lighting service into or out of service. A user may make or break the electrical switch by removing or inserting a key or other object into the aperture 7 of the unit 55, which is aligned with the aperture 8 of the pushbutton 10 for access. In this manner, the user can conveniently place the battery in service or remove the battery from service. Representative example embodiments of the battery connect/disconnect unit 55 are disclosed in U.S. Pat. No. 8,388,170, the entire contents of which are hereby incorporated herein by reference.

As discussed in further detail below, FIGS. 2, 3, 4, 5, and 6 illustrate other representative control module embodiments.

Figure 2:
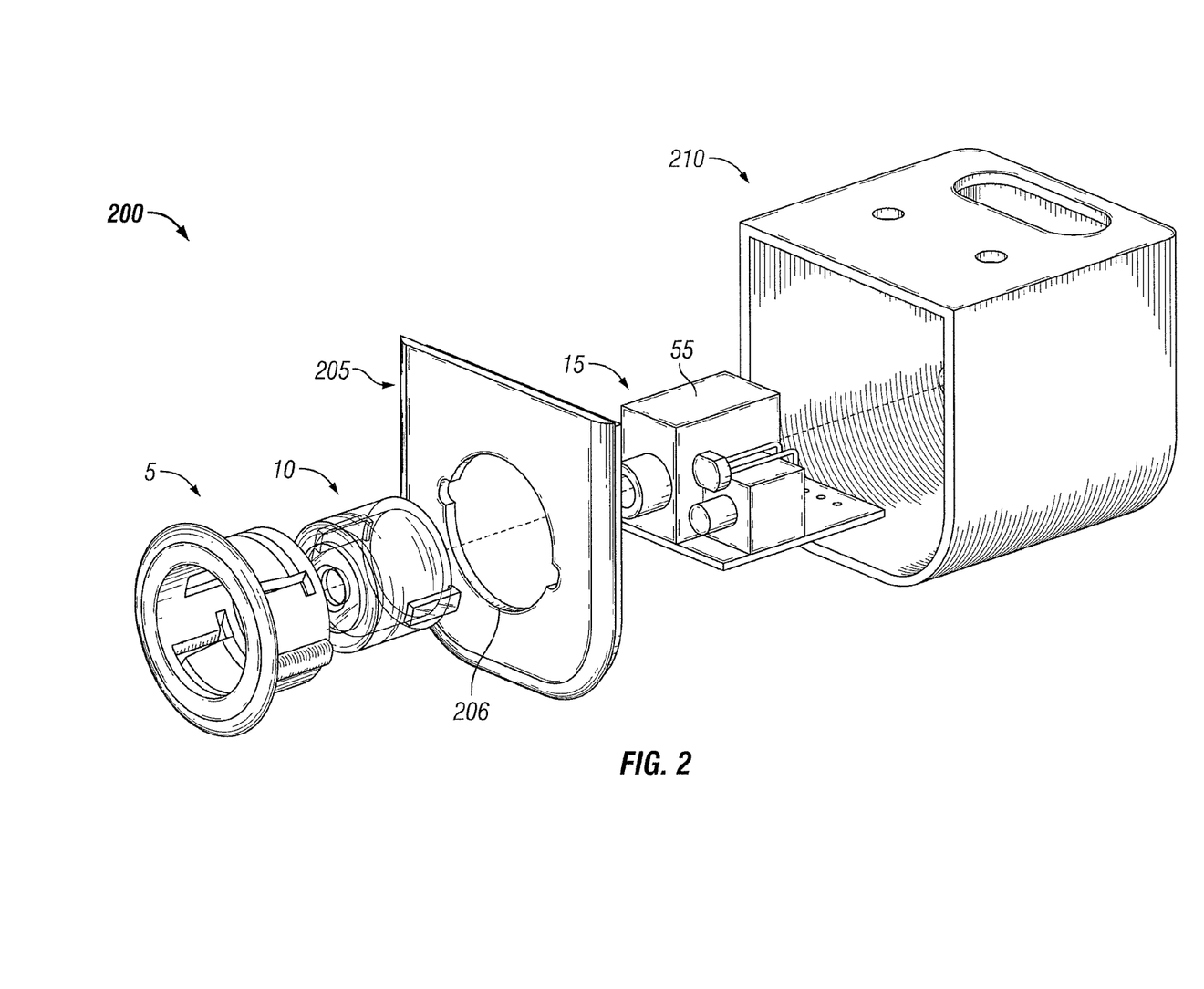
FIG. 2 illustrates, in exploded form, a representative control module that is housed for mounting in an emergency lighting system according to some example embodiments of the present technology.

FIG. 2 is an illustration of a representative control module 200 that is housed in an enclosure 210 for mounting in an emergency lighting system in accordance with some example embodiments. A wall 205 of the enclosure 210 contains an aperture in which the retainer element 5 is inserted and retained as discussed above with reference to FIG. 1.

In some embodiments, the enclosure 210 is environmentally sealed. In some embodiments, the enclosure 210 is moisture tight. In some embodiments, the enclosure 210 is explosion proof. In some embodiments, the enclosure 210 is rated for outdoor deployment but may be used indoors. In some embodiments, the enclosure 210 is intended for indoor deployment.

The control module 200 can be mounted to an external surface of a housing or frame of the emergency lighting system or some other appropriate system that is powered at least in part by electricity. In some embodiments, the control module 200 is mounted to an inner surface, with the wall 205 externally exposed for user access.

In some embodiments, the internal surfaces of the enclosure 210 comprise slots that support the electronics system 15. Such slots may be similar to the slots 61 illustrated in FIG. 1 and discussed above.

Figure 3A:
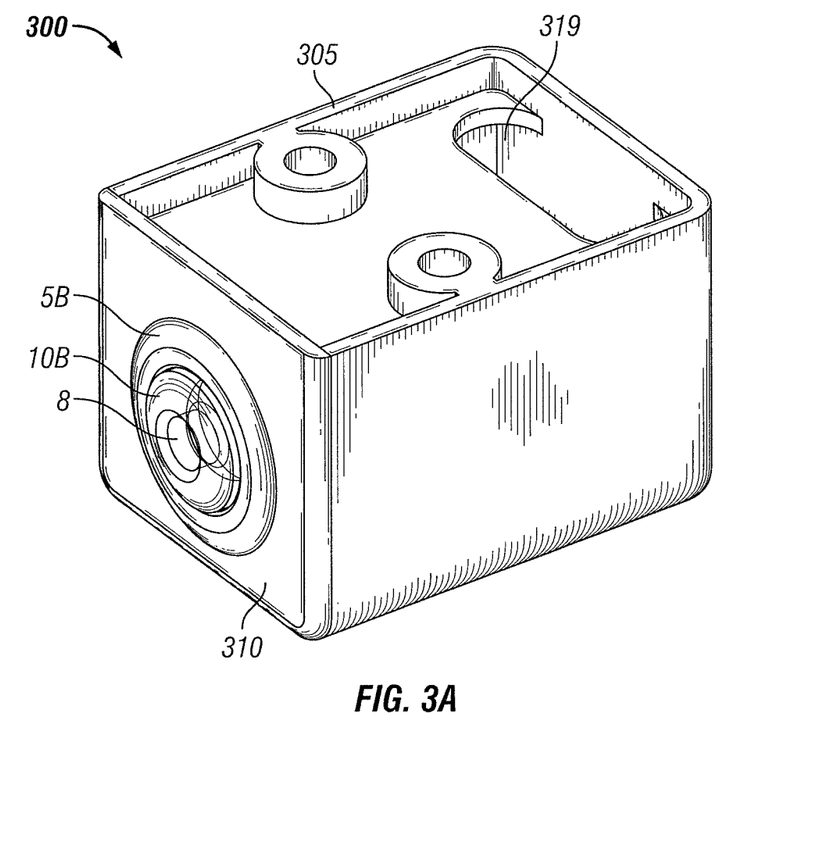
FIGS. 3A and 3B (collectively FIG. 3) illustrate, respectively in fully assembled form and in exploded form, another representative control module that is housed for mounting in an emergency lighting system according to some example embodiments of the present technology.
Figure 3B:
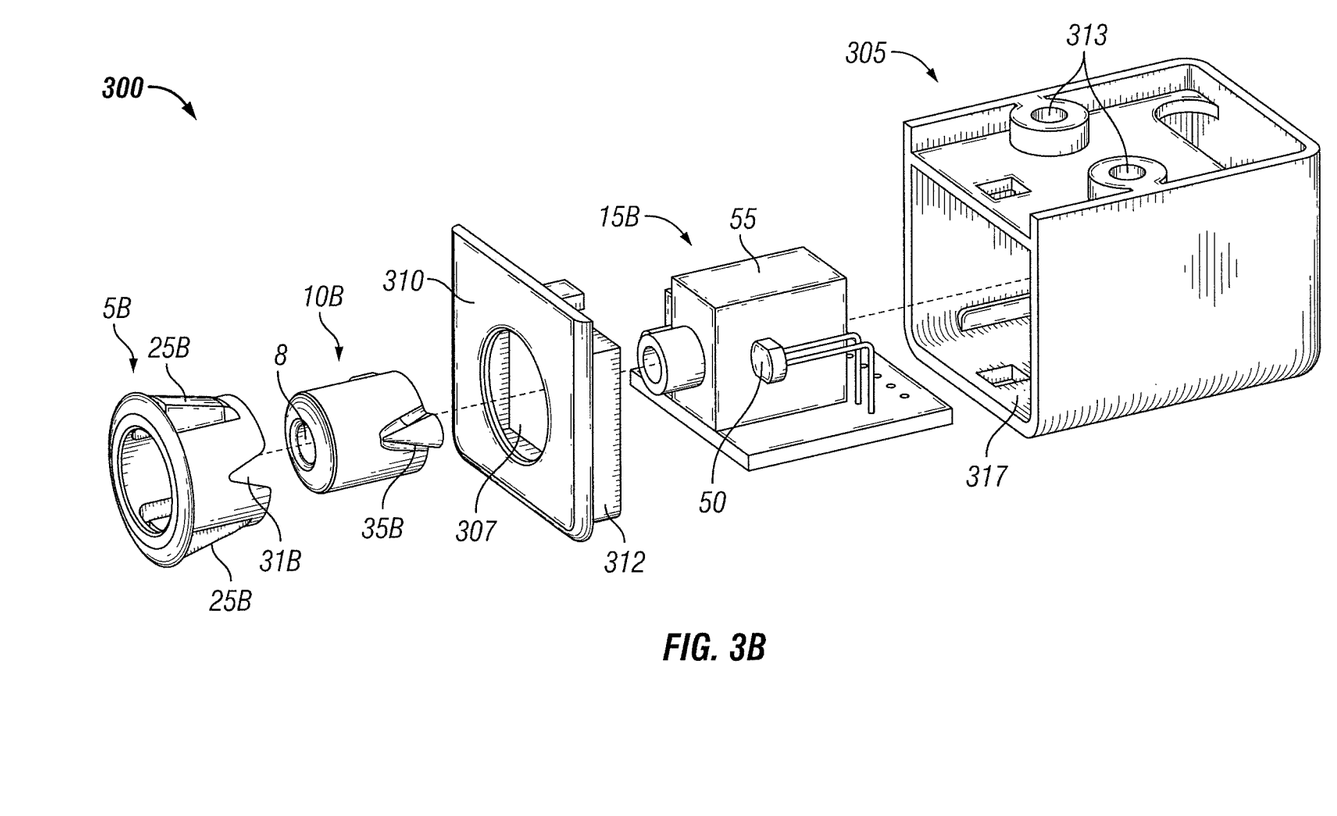

Turning now to FIG. 3, this figure provides illustrations of another representative control module 300 that is housed for mounting in or with an electrical system, such as an emergency lighting system, in accordance with some example embodiments. FIG. 3A illustrates the module 300 as fully assembled, while FIG. 3B illustrates an exploded view.

In the embodiment illustrated in FIG. 3, the enclosure 305, enclosure cover 310, electronics system 15B, retainer element 5B, and pushbutton 10B have alternative configurations relative to the corresponding elements of the control module 100 of FIG. 1 that are discussed above, but may provide common or substantially similar functionality.

In the embodiment of FIG. 3, the enclosure cover 310 comprises a shoulder 312 that seats in a corresponding opening 317 in the enclosure 305. The enclosure cover 310 and the enclosure opening 317 can be fitted to one another with mating features to facilitate assembly, for example.

In some embodiments, the enclosure 305 and the enclosure cover 310 are formed of metal, for example cast or machined aluminum or steel. In some example embodiments, one or both of the enclosure 305 and the enclosure cover 310 are formed of a nonmetallic material such as plastic, composite, or fiberglass.

In the illustrated embodiment, the enclosure 305 comprises mounting facilities 313. Example embodiments of the mounting facilities 313 can comprise threaded apertures or holes sized to receive or capture threaded fasteners or rivets. The upper surface of the enclosure 305 can be positioned against a mounting surface of a lighting system, for example an emergency lighting system, or other system powered with battery or line electrical power. Another aperture 319 provides passage for electrical wiring.

The enclosure cover 310 comprises an aperture 307 that is sized to receive a retainer element 5B. When the retainer element 5B is inserted into the aperture 307, retention protrusions 25B deflect inward until the retainer element 5B is fully inserted. Once the retainer element 5B is fully inserted, the retention protrusions 25B return to their original, relaxed positions so that the retainer element 5B is captured in the aperture 307.

A pushbutton 10B nests into the retainer element 5B and comprises a protrusion 35B that fits into a corresponding groove 31B in the retainer element 5B. As discussed above with reference to FIGS. 1 and 2, the pushbutton 10B can be formed of a material that transmits light so that light from outside the enclosure 305 can enter the enclosure 305 for receipt by the photodetector 50. In the illustrated embodiment, the protrusion 35B can guide or channel light to the photodetector 50, thereby providing efficient light coupling.

Figure 4A:
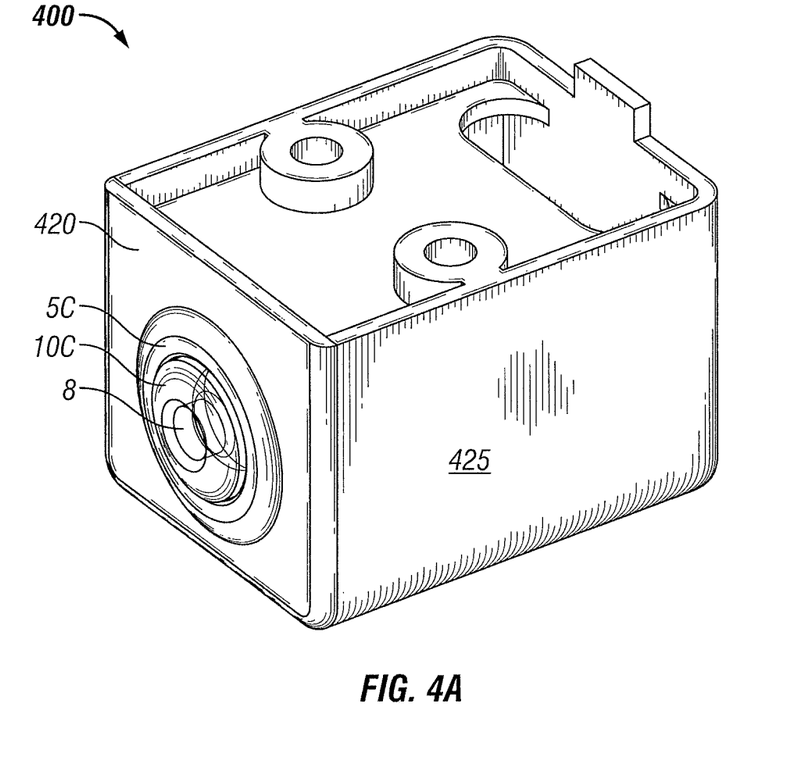
FIGS. 4A and 4B (collectively FIG. 4) illustrate, respectively in fully assembled form and in exploded form, another representative control module that is housed for mounting in an emergency lighting system according to some example embodiments of the present technology.
Figure 4B:
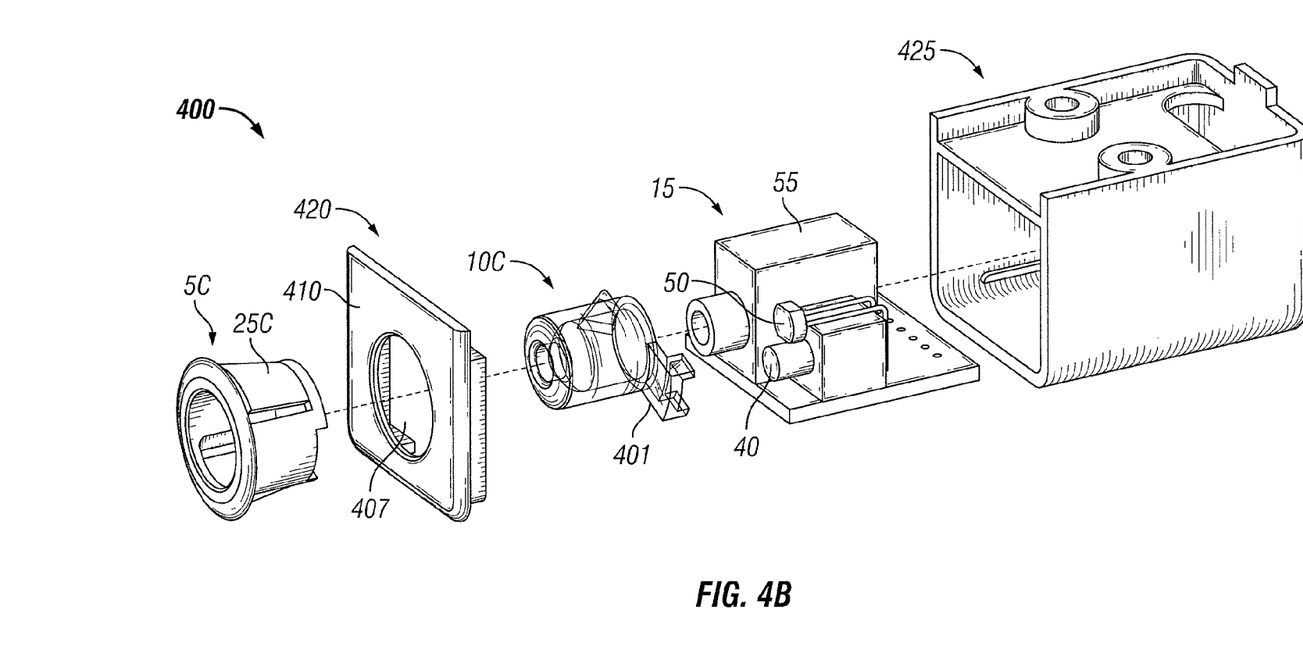

Turning now to FIG. 4, this figure provides illustrations of another representative control module 400 that is housed for mounting in or with an emergency lighting system, in accordance with some example embodiments. FIG. 4A illustrates the module 400 as fully assembled, while FIG. 4B illustrates an exploded view.

In the embodiment illustrated in FIG. 4, the enclosure 425, enclosure cover 420, retainer element 5C, and pushbutton 10C have alternative configurations relative to the corresponding elements of the control module 100 of FIG. 1, but may provide common functionality.

Similar to the embodiment of FIG. 3, the enclosure cover 410 comprises an aperture 407 that is sized to receive a retainer element 5C. When the retainer element 5C is inserted into the aperture 407, retention protrusions 25C deflect inward until the retainer element 5C is fully inserted. Once the retainer element 5C is fully inserted, the retention protrusions 25C return to their original, relaxed positions so that the retainer element 5C is captured in the aperture 407.

The pushbutton 10C can comprise transparent or translucent plastic for transmitting light to the photodetector 50, as discussed above. The pushbutton 10C comprises a protrusion 401 extending radially outward from the periphery of the pushbutton 10C to transfer linear movement to the pushbutton switch 40 and light to the photodetector 50. In the illustrated embodiment, the protrusion 401 comprises a generally flat surface that projects radially outward from the pushbutton side.

Figure 5A:
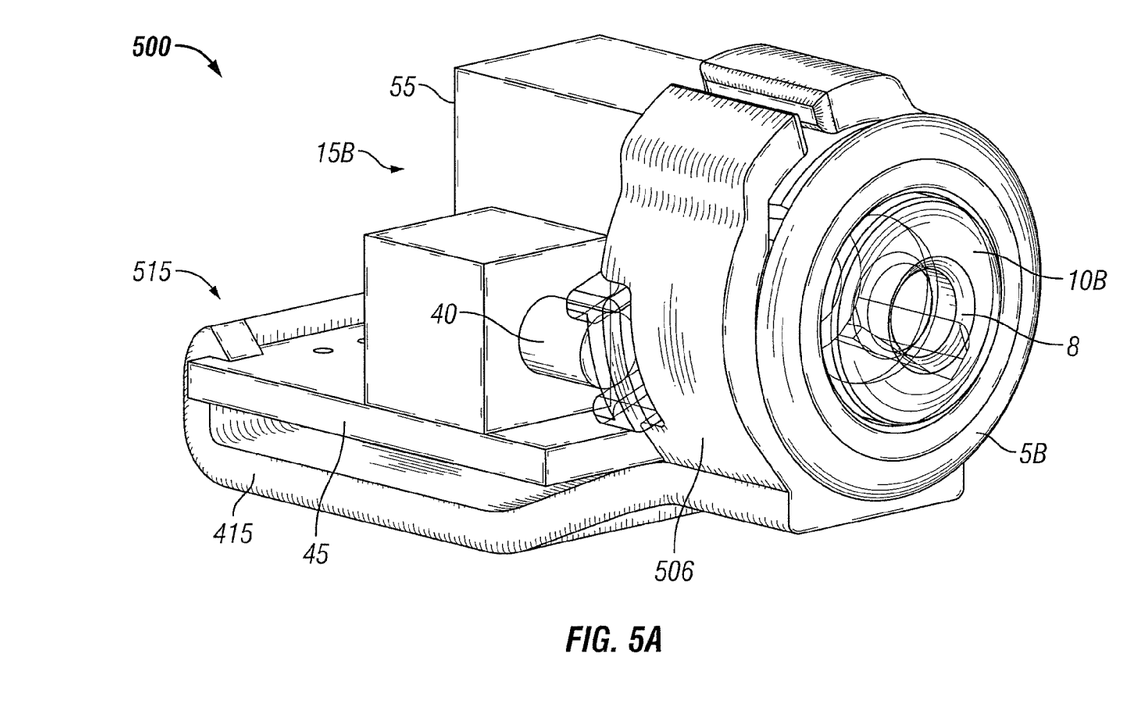
FIGS. 5A and 5B (collectively FIG. 5) illustrate, respectively in fully assembled form and in exploded form, another representative control module that is configured for mounting at a knockout hole of an emergency lighting system according to some example embodiments of the present technology.
Figure 5B:
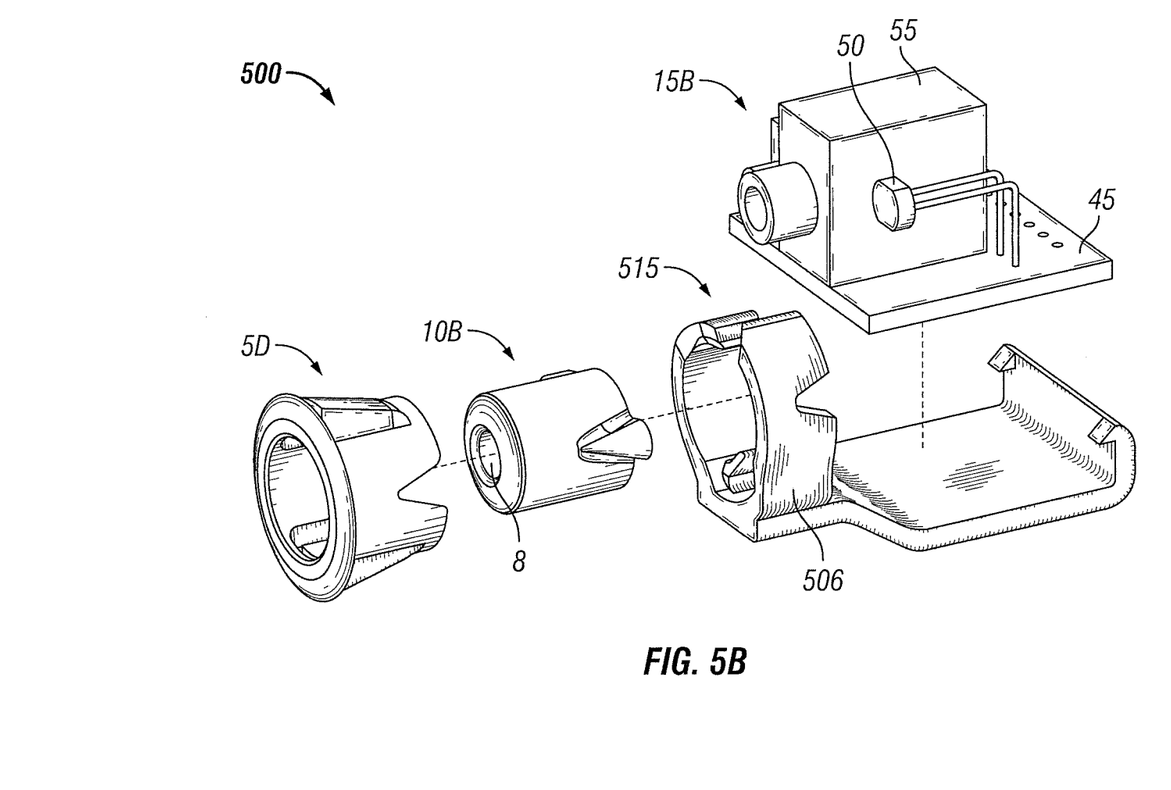

Turning now to FIG. 5, this figure provides illustrations of another representative control module 500 that is configured for mounting in an aperture, such a knockout hole, of an emergency lighting system or other system where one or more of the above described control features may be beneficial in accordance with some example embodiments. FIG. 5A illustrates the module 500 as fully assembled, while FIG. 5B illustrates an exploded view.

In the embodiment illustrated in FIG. 5, the bracket 515 has an alternative configuration relative to the bracket 20 of the control module 100 of FIG. 1, but may provide similar functionality. In the illustrated embodiment, the bracket 515 curls over the rear end of the circuit board 45. The circuit board 45 can clip in the bracket 515 for retention, for example.

The pushbutton end of the bracket 20 further comprises a loop 506 that extends about the periphery of the retainer element 5D. In an example embodiment, the bracket 515 is formed of a plastic or metallic material that tends to return to its original form when deformation pressure is released. Thus, the loop 506 can be forced open slightly to facilitate insertion of the retainer element 5D. Once the retainer element 5D is so inserted, the force on the loop 506 can be released so that the diameter of the loop 506 reduces, and the loop 506 firmly grasps the retainer element 5D.

Figure 6A:
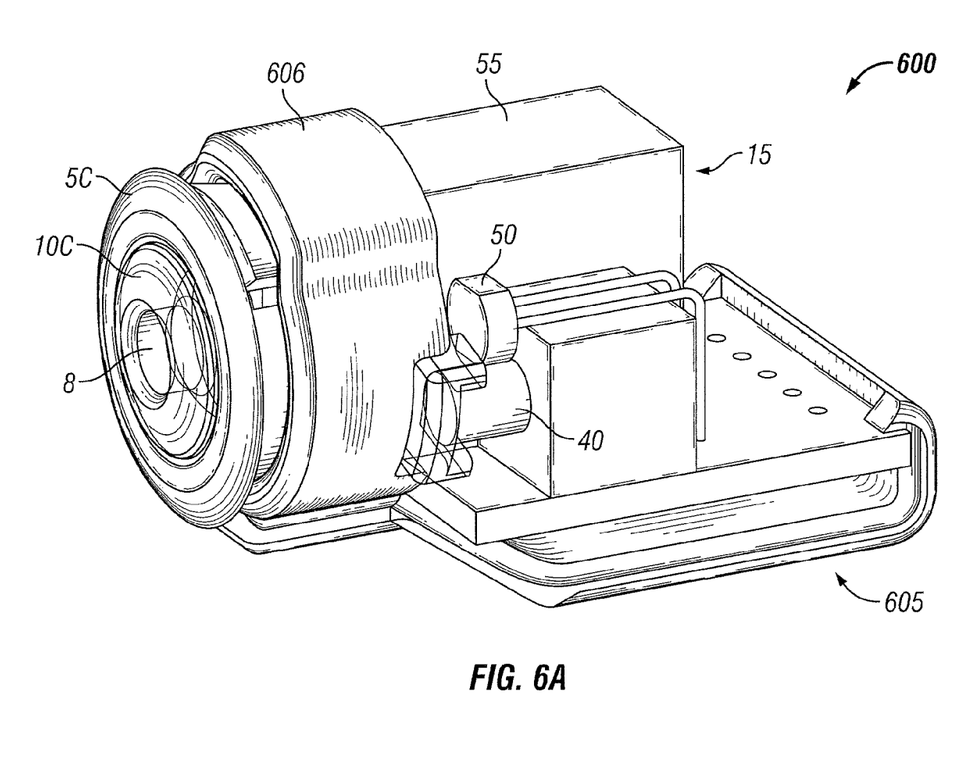
FIGS. 6A and 6B (collectively FIG. 6) illustrate, respectively in fully assembled form and in exploded form, another representative control module that is configured for mounting at a knockout hole of an emergency lighting system according to some example embodiments of the present technology.
Figure 6B:
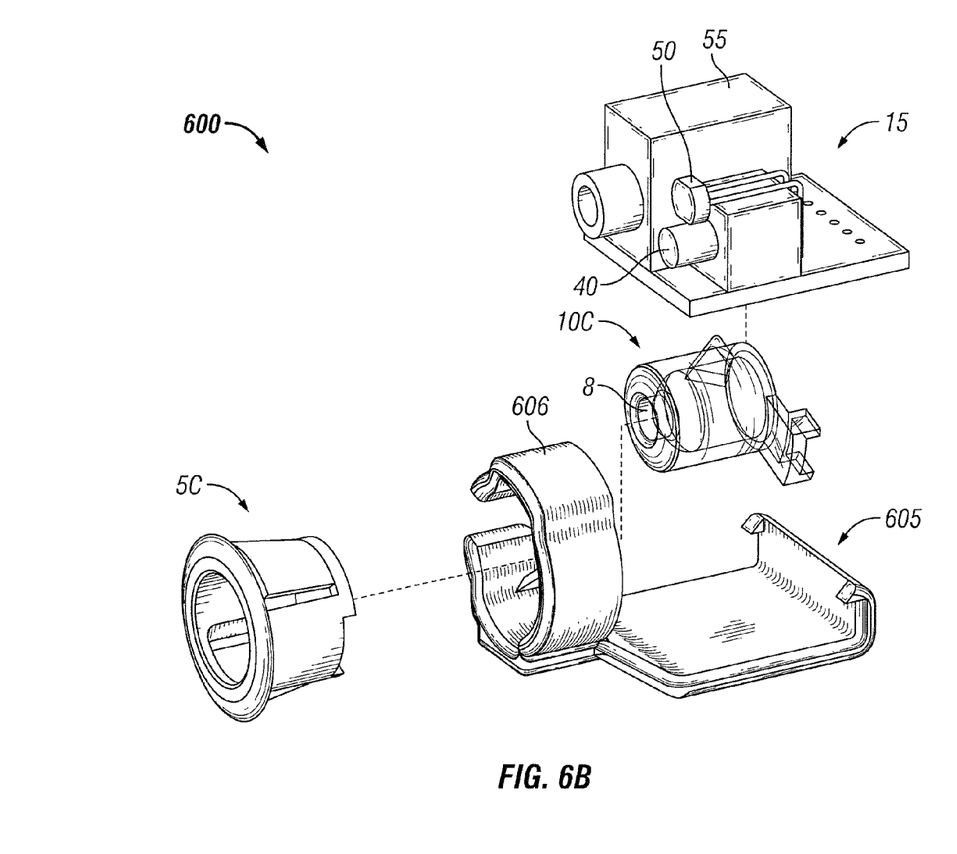

Turning now to FIG. 6, this figure provides illustrations of another representative control module 600 that is configured for mounting in an aperture, such as a knockout hole, of an emergency lighting system or other system where one or more of the above described control features may be beneficial in accordance with some example embodiments. FIG. 6A illustrates the module 600 as fully assembled, while FIG. 6B illustrates an exploded view.

In the embodiment illustrated in FIG. 6, the control module 600 has an alternative configuration relative to the corresponding elements of the control module 500 of FIG. 5, but may provide similar functionality. In the embodiment of FIG. 6, the loop 606 clamps about the retainer element 5C for retention. During assembly of the control module 600, the loop 606 can open to receive the retainer element 5C. Once the retainer element 5C is inserted into the loop 606, the loop ends can be snapped shut to clasp and capture the retainer element 5C.

Technology for controlling emergency lighting systems has been described. From the description, it will be appreciated that embodiments of the present technology overcome limitations of the prior art. Those skilled in the art will appreciate that the present technology is not limited to any specifically discussed application or implementation and that the embodiments described herein are illustrative and not restrictive. From the description of the example embodiments, equivalents of the elements shown therein will suggest themselves to those skilled in the art, and ways of constructing other embodiments of the present technology will appear to practitioners of the art.

What is claimed is:

1. A system comprising:
   an electrical switch that is operative to make or break an electrical contact responsive to depression of a member;
   a light detector disposed adjacent the electrical switch; and
   a pushbutton that adjoins the member and that is operative to translate linear motion to the member, the pushbutton formed of material through which light passes and comprising:
   a side; and
   a protrusion extending from the side of the pushbutton to an area in front of the light detector, the protrusion disposed to couple light to the light detector so that light passes through the pushbutton to the light detector.

2. The system of claim 1, further comprising a retaining element that comprises a groove, wherein at least part of the protrusion is disposed in the groove.

3. The system of claim 1, wherein the material comprises optically transparent plastic.

4. The system of claim 1, wherein the material comprises translucent plastic.

5. The system of claim 1, further comprising an indicator light emitting diode disposed adjacent the pushbutton and oriented to pass indication light through the pushbutton for user observation.

6. The system of claim 1, wherein the pushbutton comprises an aperture, and
   wherein the system further comprises another electrical contact that is aligned with the aperture for manipulation by an object inserted through the another aperture.

7. The system of claim 6, wherein the object comprises a key.

8. The system of claim 1, wherein the light detector comprises an occupancy detector that is oriented for detecting human presence based on photonic energy passing through the pushbutton.

9. The system of claim 1, wherein the light detector comprises an ambient light detector disposed adjacent the pushbutton.

10. The system of claim 1, comprising a Doppler detector disposed adjacent the electrical switch.

11. A system comprising:
    a pushbutton that comprises:
    an aperture;
    a peripheral area that is circumferentially disposed with respect to the aperture and is formed of a material that transmits light; and
    a protrusion extending radially outward from the peripheral area;
    a first electrical switch that is disposed adjacent the pushbutton and that is controllable by movement of the pushbutton;
    a photodetector that is laterally offset from the peripheral area of the pushbutton, wherein the protrusion is disposed to guide light from the peripheral area to the photodetector; and
    a second electrical switch that is aligned with the aperture and that is controllable by insertion of an object into the aperture.

12. The system of claim 11, wherein the object comprises a key.

13. The system of claim 11, further comprising a retaining element that comprises a groove in which the protrusion is disposed.

14. The system of claim 13, wherein the photodetector comprises an ambient light detector.

15. The system of claim 13, wherein the photodetector comprises an occupancy detector.

16. The system of claim 11, further comprising:
    a circuit board that supports the first electrical switch and the second electrical switch;
    a bracket that supports the circuit board; and
    an enclosure in which the circuit board and bracket are enclosed.

17. A system that comprises:
    an enclosure comprising a wall, the wall comprising an aperture;
    a circuit disposed in the enclosure, the circuit comprising:
    an electrical switch that is disposed in the enclosure; and
    a photodetector that is disposed in the enclosure behind the wall; and
    a pushbutton formed of a material that transmits light, operable to actuate the electrical switch, and comprising:
    a portion that extends through the aperture and that transmits light from outside the enclosure to inside the enclosure; and
    a protrusion on the portion of the pushbutton, wherein the protrusion extends from the portion of the pushbutton to behind the wall and in front of the photodetector and is configured to guide the transmitted light for reception by the photodetector.

18. The system of claim 17, wherein the photodetector comprises an ambient light detector or an occupancy detector.

19. The system of claim 17, wherein the photodetector is configured for receiving laser light directed to the pushbutton from a laser disposed outside the enclosure.

20. The system of claim 17, wherein the protrusion comprises a generally flat surface that projects radially outward from a side of the pushbutton.

* * * * *